S. B. JOHNSON.
Grain-Cleaners.

No. 155,955.

Patented Oct. 13, 1874.

WITNESSES:
Colon Kemon
Edw. W. Byrn

INVENTOR:
S. B. Johnson
BY
ATTORNEYS.

UNITED STATES PATENT OFFICE.

SAMUEL B. JOHNSON, OF OSWEGO, NEW YORK.

IMPROVEMENT IN GRAIN-CLEANERS.

Specification forming art of Letters Patent No. 155,955, dated October 13, 1874; application filed April 21, 1874.

*To all whom it may concern:*

Be it known that I, SAMUEL B. JOHNSON, of the city and county of Oswego and State of New York, have invented a new and Improved Machine for Cleaning Grain; and I do hereby declare that the following is a full, clear, and exact description of the same, reference being had to the accompanying drawing forming a part of this specification, in which—

Figure 1:
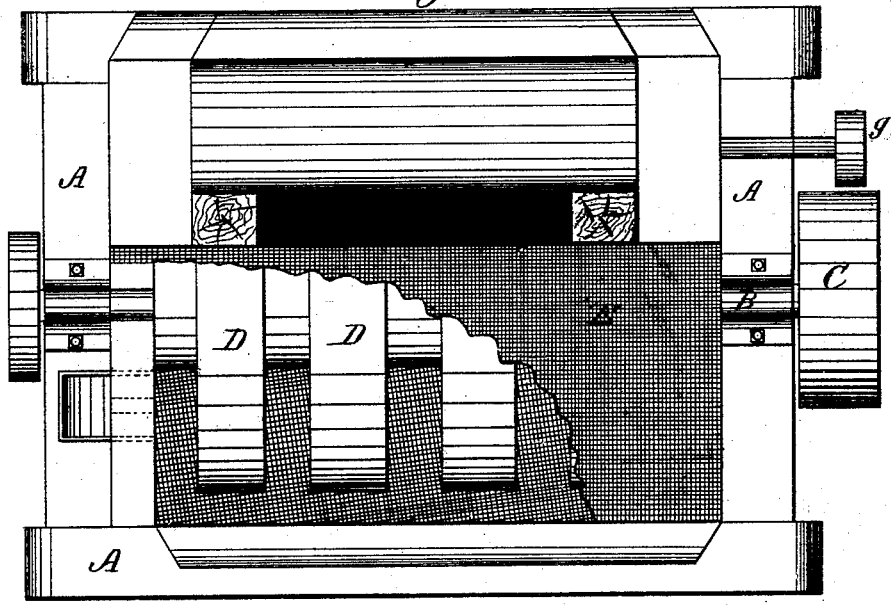
Figure 2:
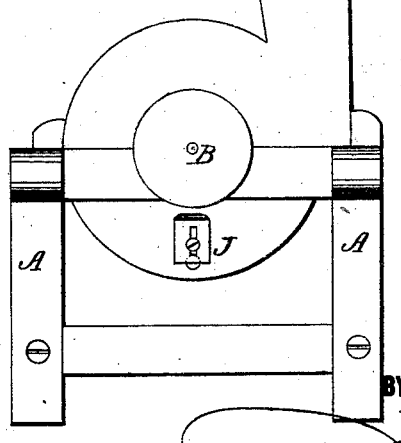

Figure 1 is a front, and Fig. 2 a sectional, elevation.

The invention will first be fully described, and then pointed out in the claim.

A represents the frame; B, a rotary shaft journaled therein; C, a pulley, and D a series of intervaled scouring-wheels roughened on their peripheries. E is a stationary surrounding reticulated sieve or cylinder, having heads that contain an entrance and discharge opening for the grain. F is a vertical channel-way, in the upper part of which is placed, longitudinally, a suction-fan, G, on whose shaft is a pulley, $g$, driven from main driving-pulley, C. This will carry up detached portions of chaff, dust, and other matter, as the grain is successively rubbed by the friction-disks D while passing from the inlet to the outlet of cleaner.

What I claim to be new, and desire to protect by Letters Patent, is—

The combination of stationary sieve E, rotary intervaled scourers D, and the suction-fan G in the channel F, as and for the purpose specified.

SAMUEL B. JOHNSON.

Witnesses:
C. T. LYON,
GUED. T. LYON.